United States Patent
Jeong et al.

(10) Patent No.: US 12,447,194 B2
(45) Date of Patent: Oct. 21, 2025

(54) COMPOSITION FOR DIAGNOSING, PREVENTING, OR TREATING COGNITIVE DYSFUNCTION COMPRISING COTL1 AS ACTIVE INGREDIENT

(71) Applicant: AJOU UNIVERSITY INDUSTRY-ACADEMIC COOPERATION FOUNDATION, Suwon-si (KR)

(72) Inventors: Seon Yong Jeong, Yongin-si (KR); Eunkuk Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 765 days.

(21) Appl. No.: 17/777,464

(22) PCT Filed: Nov. 19, 2020

(86) PCT No.: PCT/KR2020/016329
§ 371 (c)(1),
(2) Date: May 17, 2022

(87) PCT Pub. No.: WO2021/101257
PCT Pub. Date: May 27, 2021

(65) Prior Publication Data
US 2023/0355710 A1 Nov. 9, 2023

(30) Foreign Application Priority Data

Nov. 19, 2019 (KR) .................... 10-2019-0149076
Nov. 19, 2020 (KR) .................... 10-2020-0155079

(51) Int. Cl.
*A61K 38/17* (2006.01)
*A61P 25/28* (2006.01)
*C12Q 1/6883* (2018.01)
*G01N 33/68* (2006.01)

(52) U.S. Cl.
CPC .......... *A61K 38/1709* (2013.01); *A61P 25/28* (2018.01); *C12Q 1/6883* (2013.01); *G01N 33/6896* (2013.01); *C12Q 2600/158* (2013.01); *G01N 2800/2814* (2013.01)

(58) Field of Classification Search
CPC ..... A61K 38/17; A61K 38/1709; A61P 25/28; C12Q 1/6883; C12Q 2600/158; G01N 2800/2814; G01N 33/6896
See application file for complete search history.

(56) References Cited

U.S. PATENT DOCUMENTS

2014/0304845 A1  10/2014  Loboda et al.

FOREIGN PATENT DOCUMENTS

| KR | 10-2012-0137386 A | 12/2012 |
| KR | 10-2014-0042331 A | 4/2014 |
| KR | 10-2017-0001943 A | 1/2017 |
| KR | 10-2019-0071990 A | 6/2019 |

OTHER PUBLICATIONS

Alzheimer's Disease from Merck Manual, pp. 1-10. Accessed Nov. 27, 2018. (Year: 2018).*
Dementia from Merck Manual, pp. 1-17. Accessed Jul. 29, 2009. (Year: 2009).*
Amnesias from Merck Manual, pp. 1-4. Accessed Jun. 30, 2025. (Year: 2025).*
Xia, L et al. "coactosin-like protein [*Homo sapiens*]" NCBI Reference Sequence: NP_066972.1 Apr. 29, 2025. pp. 1-3.
Li, Guohong, et al. "Coactosin-like protein 1 inhibits neuronal migration during mouse corticogenesis." *Journal of Veterinary Science* vol. 19.1 (Jan. 1, 2018): pp. 21-26.
Romito-DiGiacomo, Rita R., et al. "Effects of Alzheimer's disease on different cortical layers: the role of intrinsic differences in Aβ susceptibility." *Journal of Neuroscience* vol. 27.32 (Aug. 8, 2007): pp. 8496-8504.

* cited by examiner

*Primary Examiner* — Julie Ha
(74) *Attorney, Agent, or Firm* — NSIP Law

(57) ABSTRACT

A composition for diagnosing, preventing, or treating cognitive dysfunction comprising, as an active ingredient, COTL1 protein or a gene encoding same is described.

1 Claim, 3 Drawing Sheets

COMPOSITION FOR DIAGNOSING, PREVENTING, OR TREATING COGNITIVE DYSFUNCTION COMPRISING COTL1 AS ACTIVE INGREDIENT

CROSS REFERENCE TO RELATED APPLICATIONS

This application is a U.S. National Stage Application of International Application No. PCT/KR2020/016329, filed on Nov. 19, 2020, which claims the benefit under 35 USC 119(a) and 365(b) of Korean Patent Application Nos. 10-2019-0149076 filed on Nov. 19, 2019 and 10-2020-0155079 filed on Nov. 19, 2020, in the Korean Intellectual Property Office, the entire disclosures of which are incorporated herein by reference for all purposes.

TECHNICAL FIELD

The present disclosure relates to a composition for diagnosing, preventing, or treating cognitive dysfunction including a COTL1 protein or a gene encoding the same as an active ingredient.

BACKGROUND ART

According to the 'World and Korea Population Status and Prospect' released by the National Statistical Office in 2019, the proportion of the population over 65 years of age in Korea will reach 37.0% in 2045, surpassing that of Japan (36.7%). This is a result of comparative analysis on world population projections for 201 countries conducted by the United Nations and special projections for future population in 2017-2067 conducted by National Statistical Office, and the proportion of the elderly population in Korea is projected to grow at the fastest rate in the world from 14.9% in 2019 to 46.5% in 2067.

Meanwhile, cognitive dysfunction which is to lose the ability of cognitive function may be divided into dementia and mild cognitive impairment. Dementia is an acquired multiple disorder that affects daily life due to deterioration in functions such as memory, language ability, judgment, and performance caused by degenerative brain disease or cerebrovascular disease. Mild cognitive impairment refers to a state in which a person complains of subjective memory impairment, or an abnormality is found on an objective test, but does not affect daily life while the mental function is maintained normally, meaning that it is hardly determined as dementia. Although the process of killing nerve cells takes place in the brain before the onset of mild cognitive impairment, there are still no symptoms at this stage, and it is difficult to distinguish the same from memory impairment caused by normal aging.

Mild cognitive impairment is more common than dementia that 15-30% of the elderly in 60s may fall under this category and also increases with age. About 15% of mild cognitive impairment develops symptoms of dementia every year. By 2050, the number of dementia patients worldwide is expected to exceed 100 million, 3.1 times that of 2013, and Korea is expected to be a country showing the fastest increase in the number of dementia patients in the world due to super-aging that population over 65 years of age exceeds more than 20% of the population, thereby becoming a major social concern.

As society gradually gets older, senile dementia is emerging as the biggest health problem to be solved by mankind in the $21^{st}$ century, and it is necessary to develop functional substances and foods for the prevention and treatment of cognitive dysfunction including dementia.

DISCLOSURE

Technical Problem

An object of the present disclosure is to provide a biomarker composition for diagnosing cognitive dysfunction using a factor determined to be significantly related to cognitive dysfunction, a diagnostic composition, and a diagnostic kit for cognitive dysfunction including the same.

Another object of the present disclosure is to provide a method of providing information necessary for diagnosing cognitive dysfunction by measuring the factor.

Another object of the present disclosure is to provide a composition for preventing, ameliorating, or treating cognitive dysfunction including the factor or an activator thereof.

Technical Solution

To achieve the above object, example embodiments of present disclosure provide a biomarker composition for diagnosing cognitive dysfunction including a COTL1 protein or a gene encoding the same.

Example embodiments of present disclosure provide a composition for diagnosing cognitive dysfunction including a formulation for measuring an expression level of a COTL1 protein or a gene encoding the same, and a diagnostic kit for cognitive dysfunction including the same.

Example embodiments of present disclosure provide a method of providing information necessary for diagnosing cognitive dysfunction including measuring an expression level of a COTL1 protein or a gene encoding the same in a biological sample isolated from a subject.

Example embodiments of present disclosure provide a pharmaceutical composition for preventing or treating cognitive dysfunction including a COTL1 protein or a gene encoding the same, or an expression promoter or activator thereof as an active ingredient.

In addition, example embodiments of present disclosure provide a health functional food composition for preventing or ameliorating cognitive dysfunction including a COTL1 protein or a gene encoding the same, or an expression promoter or activator thereof as an active ingredient.

Advantageous Effects

A COTL1 protein or a gene encoding the same according to example embodiments of the present disclosure plays a vital role in mitochondrial morphology regulation, and when the expression thereof is inhibited, learning ability and memory are deteriorated, so that the COTL1 protein or the gene encoding the same may be effectively used in the diagnosis of cognitive dysfunction.

In addition, it is possible to more effectively prevent, ameliorate, or treat cognitive dysfunction by using the COTL1 protein or a gene encoding the same, or an expression promoter or activator thereof.

BRIEF DESCRIPTIONS OF THE DRAWINGS

BEST MODE

Figure 1:
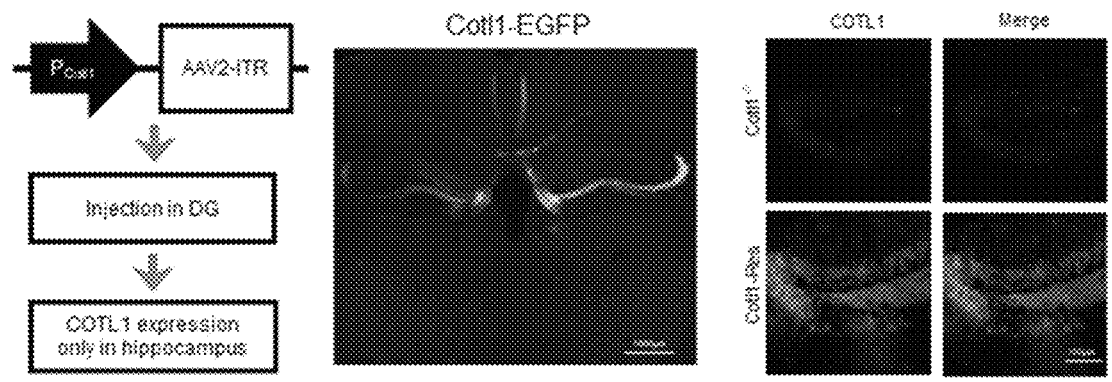
FIG. 1 shows images of Cotl1-GFP and stained COTL1 in which expression was induced via re-injection of a COTL1 gene into the hippocampus of COTL1 knock-out mice.

Hereinafter, the present invention will be described in detail.

The present inventors completed the invention by confirming the relationship between cognitive deterioration and COTL1 via a passive avoidance test using COTL1 knock-out mice, COTL1 rescue mice, and normal mice, and confirming that the cognitive function was deteriorated when the expression thereof decreased and could be restored when the expression thereof increased.

An example embodiment of the present disclosure provides a biomarker composition for diagnosing cognitive dysfunction including a COTL1 protein or a gene encoding the same.

The term "COTL1" as used herein refers to a coactosin-like protein, whose gene encodes one of actin-binding proteins that regulate the actin cytoskeleton, and a protein thereof binds to F-actin and is stabilized by interaction with 5-lipoxygenase (ALOX5). It is also referred to as "coactosin-like F-actin binding protein" or "CLP", which may include a physiologically active fragment thereof having substantially the same activity as COTL1 or a fusion protein thereof, but is not limited thereto.

The cognitive dysfunction may be selected from the group consisting of dementia, Parkinson's disease, learning disorder, agnosia, amnesia, aphasia, Pick disease, mild cognitive impairment, and Binswangers disease, preferably dementia and Alzheimer's disease, but is not limited thereto.

The term "diagnosis" as used herein refers to determining the presence or characteristics of a pathological state, and for the purpose of the present disclosure, it may refer to determining the development or progression of cognitive dysfunction, preferably the development or progression of dementia.

When the expression or activity of the COTL1 protein or the gene thereof is inhibited, cognitive functions such as memory and learning ability are deteriorated, and cognitive dysfunction may be diagnosed through changes in the expression or activity of the protein or the gene thereof.

The term "biomarker" as used herein refers to an indicator that may detect changes in the body and may include, as a substance that may check the normal or pathological state of a living organism as well as changes thereof, organic biomolecules such as polypeptides, nucleic acids, lipids, glycolipids, glycoproteins, and sugars (monosaccharides, disaccharides, and oligosaccharides), thereby diagnosing cognitive dysfunction using the same as in the present disclosure.

The biomarker according to an example embodiment of the present disclosure shows the same result even in repeated experiments, and since the change in the expression level thereof shows a significant result, the biomarker seems to be highly reliable such that the predicted result may be reasonably trusted.

An example embodiment of the present disclosure provides a composition for diagnosing cognitive dysfunction including a formulation for measuring the expression level of a COTL1 protein or a gene encoding the same.

The formulation is one of a primer or a probe specifically binding to the COTL1 gene; or an antibody, a peptide, an aptamer, or a compound specifically binding to the COTL1 protein, but is not limited thereto.

The term "primer" as used herein refers to a nucleic acid sequence having a short free 3' hydroxyl group, capable of forming base pairs with a complementary template and functioning as a starting point for replication of template strands. The primer is capable of initiating DNA synthesis in the presence of a reagent for a polymerization reaction (e.g., DNA polymerase or reverse transcriptase) and four different nucleotide triphosphates in an appropriate buffer and temperature.

The primer is specific for the gene and may be sense and antisense nucleic acids typically having sequences of 7 to 50 nucleotides, and as long as it does not change the basic properties of the primer functioning as the starting point of DNA synthesis, additional characteristics may be combined. PCR conditions and length of sense and antisense primers may be appropriately selected according to techniques known in the art.

The term "probe" as used herein refers to a nucleic acid fragment such as RNA or DNA corresponding to several bases to several hundred bases in length, which may specifically form bindings with mRNA and is also able to check the presence or absence of a specific mRNA and expression level since the probe is labeled. The probe may be in the form of an oligonucleotide probe, a single strand DNA probe, a double strand DNA probe, and a RNA probe. Appropriate probes and hybridization conditions may be appropriately selected according to techniques known in the art.

The term "antibody" as used herein is a term known in the art and refers to a specific immunoglobulin directed against an antigenic site. The antibody in an example embodiment of the present disclosure refers to an antibody that specifically binds to the protein and may be prepared according to a conventional method in the art. The form of the antibody includes a polyclonal antibody or a monoclonal antibody, and any immunoglobulin antibody may be included. The antibody refers to a complete form having two full-length light chains and two full-length heavy chains. In addition, the antibody may include a special antibody such as a humanized antibody.

The term "peptide" as used herein has high binding strength to a target substance and does not undergo denaturation even upon heat/chemical treatment. In addition, due to small molecular size, the peptide may be used as a fusion protein by being attached to other proteins. Specifically, the peptide may be used as a diagnostic kit and a drug delivery substance since the peptide is able to be used by being attached to a polymeric protein chain.

The term "aptamer" as used herein refers to a type of polynucleotide consisting of special types of single-stranded nucleic acids (DNA, RNA, or modified nucleic acid) having a stable tertiary structure by itself and capable of binding to a target molecule with high affinity and specificity. As described above, the aptamer is able to specifically bind to an antigenic substance as an antibody, has higher stability than a protein while having a simple structure, and is formed of polynucleotides that are easy to synthesize, thereby being able to be used in replacement of an antibody.

Preferably, the cognitive dysfunction may be dementia, but is not limited thereto.

Corresponding features may be substituted for the above-mentioned parts.

An example embodiment of the present disclosure provides a diagnostic kit for cognitive dysfunction including the composition for diagnosing cognitive dysfunction.

The kit may be a primer kit, a DNA chip kit, or a protein chip kit, but is not limited thereto. The kit may include an antibody that selectively recognizes a marker as well as one or more other component compositions, solutions, or devices suitable for an analysis method for diagnosis of cognitive dysfunction.

For example, the kit may include a substrate, a suitable buffer, a secondary antibody labeled with a chromogenic enzyme or a fluorescent substance, and a chromogenic substrate for immunological detection of the antibody. The substrate may include a nitrocellulose membrane, a 96-well plate synthesized with a polyvinyl resin, a 96-well plate synthesized with a polystyrene resin, and a slide glass formed of glass, and the chromogenic enzyme may include peroxidase and alkaline phosphorus while FITC and RITC may be used as the fluorescent substance. In addition, 2,2'-azino-bis(3-ethylbenzothiazoline-6-sulfonic acid) (ABTS), o-phenylene diamine (OPD), or tetramethyl benzidine (TMB) may be used as the chromogenic substrate.

Preferably, the cognitive dysfunction may be dementia, but is not limited thereto.

Corresponding features may be substituted for the above-mentioned parts.

An example embodiment of the present disclosure provides a method of providing information necessary for diagnosing cognitive dysfunction including measuring an expression level of a COTL1 protein or a gene encoding the same in a biological sample isolated from a subject.

The term "subject" as used herein refers to an individual for whom it is to be checked whether cognitive dysfunction is developed or the risk of onset is to be predicted, and the type of subject is not limited if the subject is an animal that may develop cognitive dysfunction, specifically a mammal, for example human (*Homo sapiens*).

The biological sample may be selected from the group consisting of blood, serum, serum-derived exosomes, tissues, urine, and saliva, wherein the expression level of the protein or the gene thereof is different from that of a normal control group, but is not limited thereto.

Cognitive dysfunction may be diagnosed when the expression level of the COTL1 protein or the gene encoding the same measured in the biological sample isolated from the subject is lower than the expression level of a normal control group.

The expression level of the gene may be measured by at least one method selected from the group consisting of next generation sequencing (NGS), polymerase chain reaction (PCR), reverse transcription polymerase chain reaction (RT-PCR), real-time polymerase chain reaction (real-time PCR), RNase protection assay (RPA), microarray, and northern blotting, but is not limited thereto.

In addition, the expression or activity level of the protein may be measured by at least one method selected from the group consisting of western blot, enzyme-linked immunosorbent assay (ELISA), radioimmunoassay (RIA), radio-immunodiffusion, Ouchterlony immunodiffusion method, rocket immunoelectrophoresis, tissue immunostaining, immunoprecipitation assay, complement fixation assay, and flow cytometry (FACS), but is not limited thereto.

An example embodiment of the present disclosure provides a screening method of a therapeutic drug for cognitive dysfunction including the following steps: treating a biological sample isolated from a subject with a test substance; measuring the expression level of the COTL1 protein or the gene encoding the same in the sample treated with the test substance; and selecting a test substance in which the expression level of the COTL1 protein or the gene thereof in the sample treated with the test substance is increased compared to a control group untreated with the test substance.

The screening method is a method of comparing the increase or decrease in the expression or activity of the COTL1 protein or the gene thereof in the presence or absence of a candidate substance of the therapeutic drug for cognitive dysfunction and may be useful for screening an activator of the COTL1 protein or the gene thereof and a drug for ameliorating or treating cognitive dysfunction.

In other words, a substance that increases the expression level of the COTL1 protein or the gene thereof may be selected as a therapeutic drug for cognitive dysfunction.

Corresponding features may be substituted for the above-mentioned parts.

An example embodiment of the present disclosure provides a pharmaceutical composition for preventing or treating cognitive dysfunction including a COTL1 protein or a gene encoding the same, an expression promoter or an activator thereof as an active ingredient.

The expression promoter or the activator may be an expression promoter or an activator of a known COTL1 protein or a gene thereof but is not limited thereto, and may include all substances capable of directly or indirectly enhancing the expression or activity of the COTL1 protein or the gene thereof.

Cognitive dysfunction may be prevented or treated if the expression or activity of the COTL1 protein or the gene thereof is enhanced.

The pharmaceutical composition according to an example embodiment of the present disclosure may be prepared according to a conventional method in the pharmaceutical field. The pharmaceutical composition may be combined with an appropriate pharmaceutically acceptable carrier depending on the formulation and prepared by further including, if necessary, excipients, diluents, dispersants, emulsifiers, buffers, stabilizers, binders, disintegrants, and solvents. The appropriate carrier does not degrade the activity or properties of the COTL1 protein or the gene encoding the same, the expression promoter or the activator thereof according to an example embodiment of the present disclosure and may be selected differently depending on the dosage form and formulation.

The term "pharmaceutically acceptable" as used herein refers to that there is no toxicity to cells or humans exposed to the composition.

The pharmaceutical composition according to an example embodiment of the present disclosure may be applied in any formulation, and more specifically, be used by being formulated into formulations for oral administration, external preparations, suppositories, and parenteral formulations for sterile injection solutions according to conventional methods.

A solid formulation among the formulations for oral administration is in the form of tablets, pills, discutients, granules, and capsules to be prepared by mixing at least one or more excipients such as starch, calcium carbonate, sucrose, lactose, sorbitol, mannitol, cellulose, and gelatin, and lubricants such as magnesium stearate and talc may be included in addition to simple excipients. In addition, the capsule formulation may further include a liquid carrier such as fatty oil in addition to the above-mentioned substances.

A liquid formulation among the formulations for oral administration may be suspensions, solutions, emulsions and syrups and may include various excipients such as wetting agents, sweeteners, fragrances, and preservatives in addition to water and liquid paraffin, which are commonly used simple diluents.

The parenteral formulation may include sterile aqueous solutions, non-aqueous solvents, suspensions, emulsions, freeze-dried formulations, and suppositories. As the non-aqueous solvents and suspensions, propylene glycol, polyethylene glycol, vegetable oils such as olive oil, and injectable esters such as ethyl oleate may be used. WITEPSOL®, macrogol, TWEEN™ 61, cacao butter, laurin fat, and glycerogelatin may be used as a base of the suppositories. Any appropriate agent known in the art may be used while it is not limited thereto.

In addition, the pharmaceutical composition according to an example embodiment of the present disclosure may further be added with calcium or vitamins to enhance therapeutic efficacy.

In the pharmaceutical composition according to an example embodiment of the present disclosure, the pharmaceutical composition may be administered in a pharmaceutically effective amount.

The term "pharmaceutically effective amount" used herein refers to an amount sufficient to treat a disease at a reasonable benefit/risk ratio applicable to medical treatment while not causing side effects.

The effective dose level of the pharmaceutical composition may be differently determined depending on the purpose of use, the age, sex, weight and health status of a patient, the type of disease, the severity, the activity of a drug, the sensitivity to a drug, an administration method, administration duration, administration route and excretion rate, a treatment period, elements including drugs blended or used in combination with, and other factors well known in the medical field. For example, although not constant, generally 0.001 to 100 mg/kg, preferably 0.01 to 10 mg/kg, may be administered once to several times a day. The above dosage does not limit the scope of the present disclosure in any way.

The pharmaceutical composition according to an example embodiment of the present disclosure may be administered to any animal that cognitive dysfunction may be developed, and the animal may include, for example, not only humans and primates, but also livestock such as cattle, pigs, horses, and dogs.

The pharmaceutical composition according to an example embodiment of the present disclosure may be administered in an appropriate administration route depending on the type of the formulation and may be administered via various routes, either oral or parenteral as long as it is able to reach a target tissue. The administration method is not particularly limited and may be conducted in a conventional manner, for example oral, rectal or intravenous, muscle, skin application, respiratory inhalation, and intrauterine dural or intracerebroventricular injection.

The pharmaceutical composition according to an example embodiment of the present disclosure may be used alone for the prevention or treatment of cognitive dysfunction or used in combination with surgery or other drug treatment.

In addition, an example embodiment of the present disclosure provides a health functional food composition for preventing or ameliorating cognitive dysfunction including a COTL1 protein or a gene encoding the same, an expression promoter or an activator thereof as an active ingredient.

Corresponding features may be substituted for the above-mentioned parts.

In the health functional food composition according to an example embodiment of the present disclosure, the health functional food may be prepared as powder, granules, tablets, capsules, syrups, or beverages for the purpose of preventing or ameliorating cognitive dysfunction. There is no limitation in the form that the health functional food may take, and the health functional food may be formulated in the same way as the pharmaceutical composition so as to be used as a functional food or added to various foods.

In the health functional food composition according to an example embodiment of the present disclosure, the health functional food may include all foods in a conventional sense. For example, beverages and various drinks, fruits and processed foods thereof (canned fruit and jam), fish, meat and processed foods thereof (ham and bacon), breads and noodles, cookies and snacks, and dairy products (butter and cheese) are possible, and all functional foods in a conventional sense may be included. Food used as feed for animals may also be included.

The health functional food composition according to an example embodiment of the present disclosure may be prepared by further including food additives acceptable in food science and other appropriate auxiliary components commonly used in the art. The suitability as the food additive may be determined by the standards and criteria related to corresponding items according to the general rules and general test methods of Korean Food Additives Codex approved by the Ministry of Food and Drug Safety, unless otherwise stipulated. The items listed in the "Korean Food Additives Codex" may include, for example, chemical compounds such as ketones, glycine, calcium citrate, nicotinic acid, and cinnamic acid; natural additives such as persimmon pigments, licorice extracts, crystalline cellulose, kaoliang color, and guar gum; and mixed preparations such as sodium L-glutamate preparations, noodle-added alkali agents, preservative preparations, and tar color preparations.

The other auxiliary components may additionally include, for example, flavoring agents, natural carbohydrates, sweeteners, vitamins, electrolytes, coloring agents, pectic acid, alginic acid, organic acids, protective colloidal thickeners, pH adjusting agents, stabilizers, preservatives, glycerin, alcohols, and carbonating agents. In particular, monosaccharides such as glucose and fructose, disaccharides such as maltose and sucrose, polysaccharides such as dextrin and cyclodextrin, and sugar alcohols such as xylitol, sorbitol, and erythritol may be used as the natural carbohydrate, and natural sweeteners such as thaumatin and *stevia* extracts or synthetic sweeteners such as saccharin and aspartame may be used as the sweetener.

The effective dose of the COTL1 protein or the gene encoding the same, the expression promoter or the activator thereof included in the health functional food according to an example embodiment of the present disclosure may be appropriately adjusted depending on the purpose of use such as prevention or amelioration of cognitive dysfunction.

The health functional food composition causes no side effects that may occur during long-term administration of general drugs by using food as a raw material and may be taken as an adjuvant for preventing or ameliorating cognitive dysfunction due to excellent portability.

MODES FOR CARRYING OUT INVENTION

Hereinafter, examples will be described in detail to help the understanding of the present disclosure. However, the following examples are merely illustrative of the content of the present disclosure, and the scope of the present disclosure is not limited to the following examples. The examples of the present disclosure are provided to more completely explain the present disclosure to those skilled in the art.

<Example 1> Animal Experiment for Cognitive Ability Improvement

Scopolamine is a substance that deteriorates learning ability and memory and is widely used in an efficiency test for improving memory and cognitive ability. Mice were separated into 3 groups (COTL1 knock-out mice, COTL1 rescue mice, and normal mice) to conduct an animal experiment, scopolamine (Lot No.: SLBP0022V, Sigma Aldrich, MO, U.S.A.) dissolved in 0.9% physiological saline at a concentration of 0.25 mg/mL was administered into all groups except for a normal control group not administered with scopolamine so as to induce memory loss.

<Example 2> Passive Avoidance Test for Cognitive Ability Improvement

A passive avoidance test was conducted in a conditioned box consisting of a white room and a dark room. When a test animal is placed in the white room and the light is turned on, the test animal preferring a dark place moves to the dark room which is designed to give electrical stimulation.

Briefly, the test animal was administered with scopolamine, placed in the white room, directed to move to the dark room by turning on the light, and then given with electrical stimulation so as to remember the electrical stimulation by learning the same in the dark room. The next day, the test animal was placed in the white room, and the transfer latency time to move to the dark room was measured after turning on the light to evaluate whether the electrical stimulation of the previous day was learned and remembered.

Specifically, after the test animal was placed in the white room where the light is turned off in the conditioned box (passive avoidance test box) and then adapted there for 60 seconds, a guillotine door was opened at the same time when the LED light was on in the white room. 180 seconds were given for searching and adaptation in the dark room.

The above procedure was performed the next day and repeated once more so as to make the time to enter the dark room after the light was on be within 30 seconds. The next day, 1 hour before learning, scopolamine dissolved in 0.9% physiological saline at a concentration of 0.25 mg/mL was intraperitoneally administered at a concentration of 4 ml/kg. 30 minutes after the administration of scopolamine, the test animal was placed in the white room where light is turned off, the guillotine door was opened after 10 seconds at the same time when the LED light was turned on, then the guillotine door was closed after the test animal entered the dark room, and then 0.5 mA electrical stimulation was given for 3 seconds.

The test was conducted 24 hours after the learning, and the time taken for the test animal to enter the dark room was measured with a timer. If the entering into the dark room fails for 300 seconds, the test was terminated.

Figure 2:
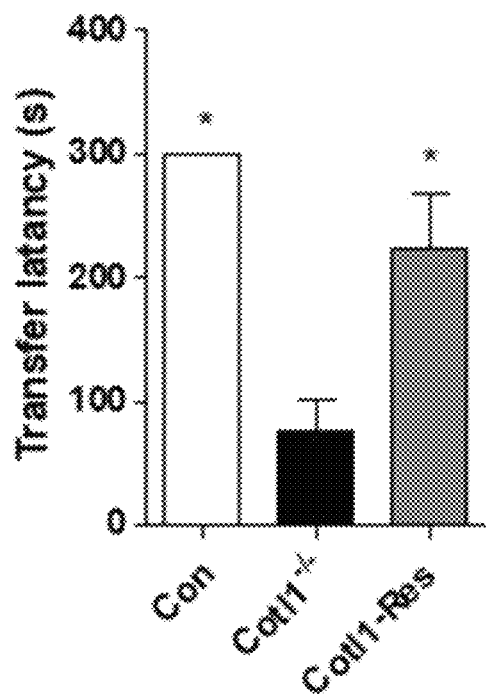
FIG. 2 shows transfer latency of COTL1 knock-out mice, COTL1 rescue mice, and normal mice to move to a dark room in a passive avoidance test.

As a result, it was determined that the time taken for the test animal to enter the dark room was faster in the COTL1 knock-out mice than in the normal mice and the COTL1 rescue mice (FIG. 2), and so COTL1 was determined as a gene that might cause memory impairment.

<Example 3> Morris Water Maze Test for Cognitive Ability Improvement

A Morris water maze test is a method of evaluating the ability to find an escape platform, wherein a water maze is divided into quadrants to hide the escape platform in one of the quadrants, and a spatial clue is attached to the direction where the escape platform is so that the test animal recognizes the spatial clue regardless of a starting point. After administration of scopolamine to test animals to induce deterioration in learning ability and memory, the Morris water maze test was conducted to evaluate the gene expression of COTL1 for cognitive ability improvement. The Morris water maze test was conducted via a SMART video tracking system (Smart 3.0, Panlab Harvard Apparatus, Spain).

Specifically, after the water maze was divided into quadrants and the escape platform was built in the center of a southwest corner of the quadrant, water was filled to make 1 cm below the water surface be submerged, and a color (Kids paint (black), Kidsmomart, Korea) was released so that the escape platform is unable to be seen. The spatial clue in the shape of a figure to recognize a space at a location where the escape platform is placed was attached to an inner wall of the water maze. After the test animal was intraperitoneally administered with scopolamine (3 mL, 23 G, Doowon meditec Co., Korea) at a concentration of 1 mg/kg and left in a home cage for 30 minutes, the Morris water maze test was conducted.

The test animal was directed to stay on the escape platform for 10 seconds and learned 4 times to find the escape platform while each learning was given from different direction, and escape latency time for the test animal to find the escape platform for each learning was recorded, followed by the same process repeated for 4 days. Training was performed continuously 4 times a day, and the average value was calculated by measuring the time to reach the escape platform.

Figure 3:
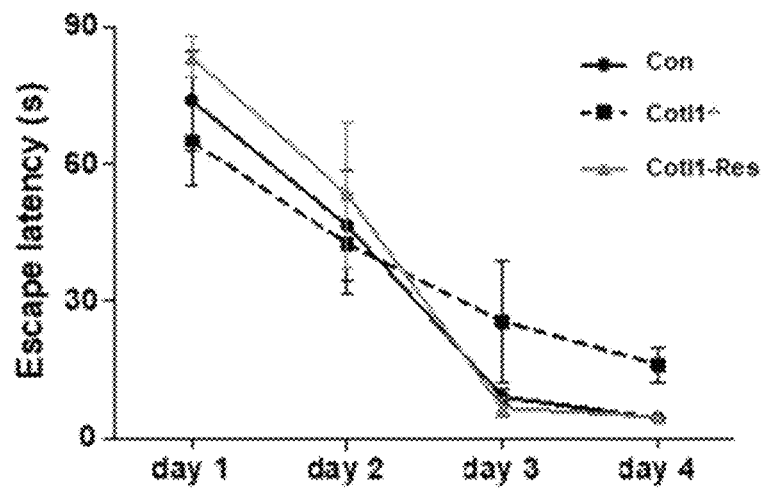
FIG. 3 shows escape latency of COTL1 knock-out mice, COTL1 rescue mice, and normal mice to find for an escape platform for 4 days in a Morris water maze test.

As a result, compared to the normal mice and the COTL1 rescue mice, the COTL1 knock-out mice took a longer time to reach the escape platform in the water maze, determining that they had cognitive dysfunction (FIG. 3).

Figure 4:
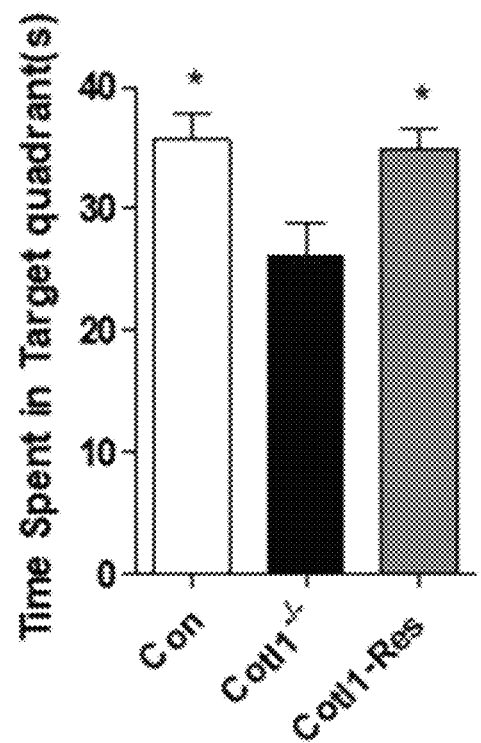
FIG. 4 shows the time spent in target quadrant of COTL1 knock-out mice, COTL1 rescue mice, and normal mice when an escape platform was removed after 4 days of a Morris water maze test.

In addition, after removing the escape platform on the $5^{th}$ day of the test, the number of times (Entries) reaching the escape platform and the time (Time spent in target quadrant) spent in the escape platform area were measured, resulting that the lower level was observed in the COTL1 knock-out mice than the normal mice and the COTL1 rescue mice (FIG. 4).

<Example 4> Y-Maze Test for Cognitive Ability Improvement

The Y-Maze is a behavioral test designed to measure the willingness of rodents to explore new environments. Since rodents generally prefer to explore arms of a new maze without returning to a previously visited place, the Y-maze is a popular method for measuring spatial working memory. In an example embodiment of the present disclosure, scopolamine was administered to test animals to induce temporary memory impairment, and then memory evaluation to find a new arm in the Y-maze was conducted.

In a Y-shaped maze with three opaque plastic arms angled at 120° to each other, the test animal freely explores the three arms. The three arms are sequentially visited if the test animal recognizes the space, and sequential visit is not made if cognitive ability is deteriorated. Therefore, the better the cognitive ability, the higher the number of sequential visits to the arm.

In order to calculate the spontaneous alternation, the name of arms that the test animal visited was recorded for 8 minutes. The test animal was considered to visit the arm when all four paws enter the arm. Measurements were performed with a SMART video tracking system (Smart 3.0, Panlab Harvard Apparatus, Spain).

Spontaneous alternation is defined by entering all three in turn while one point each is given if the test animal enters three different arms in turn, calculated by Equation 1 below.

$$\text{Spontaneous alternation \%} = \frac{\text{\# spontaneous alternations}}{\text{total number of arm entries} - 2} \times 100 \quad (1)$$

If alternation may not be calculated (in the case of entering the branch less than 4 times), it was excluded from data calculation and statistical analysis.

Figure 5:
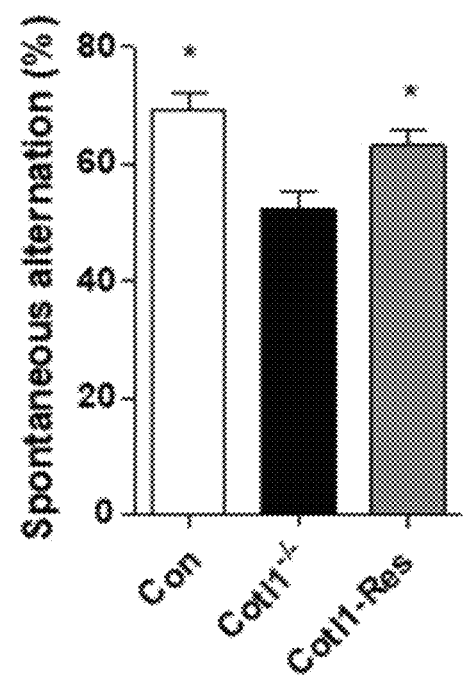
FIG. 5 shows a spontaneous alternation rate of COTL1 knock-out mice, COTL1 rescue mice, and normal mice in a Y-Maze experiment.

As a result, spontaneous alternation was found to be statistically, significantly reduced in the COTL1 knock-out mice than in the normal mice and the COTL1 rescue mice (FIG. 5).

From the above results, it was determined that COTL1 was a gene capable of inducing cognitive dysfunction, and when the COTL1 gene was re-injected into the COTL1 knock-out mice to induce expression thereof, it was determined that the cognitive dysfunction was recovered.

Although specific parts of the present invention have been described in detail above, it is clear for those skilled in the art that these specific descriptions are merely preferred example embodiments and the scope of the present invention is not limited thereto. In other words, the substantial scope of the present disclosure is defined by the appended claims and equivalents thereof.

What is claimed is:

1. A method for treating cognitive dysfunction comprising administering an effective amount of a pharmaceutical composition comprising a gene encoding a coactosin-like 1 (COTL 1) protein as an active ingredient to a subject in need thereof,
wherein the cognitive dysfunction is selected from the group consisting of dementia, Parkinson's disease, learning disorder, agnosia, amnesia, aphasia, Pick disease, mild cognitive impairment, and Binswangers disease.

* * * * *